United States Patent [19]

Rippel et al.

[11] Patent Number: 4,873,161

[45] Date of Patent: Oct. 10, 1989

[54] POSITIVE PASTE WITH LEAD-COATED GLASS FIBERS

[76] Inventors: Wally E. Rippel, 3308 Alegre La., Altadena, Calif. 91101; Dean B. Edwards, 852 N. Grant St., Moscow, Id. 83843

[21] Appl. No.: 234,094

[22] Filed: Aug. 19, 1988

[51] Int. Cl.$^4$ .............................................. H01M 4/14
[52] U.S. Cl. .................................. 429/225; 429/232; 429/235
[58] Field of Search ............... 429/232, 233, 234, 235, 429/239, 241, 243, 228

[56] References Cited

U.S. PATENT DOCUMENTS

| | | | |
|---|---|---|---|
| 1,240,076 | 9/1917 | Mears | 429/241 |
| 1,347,873 | 7/1920 | Rabe | 429/239 |
| 1,685,215 | 9/1928 | Davis | 429/241 |
| 2,234,732 | 3/1941 | Haunz | 429/239 X |
| 2,634,304 | 4/1953 | Stoertz | 429/241 X |
| 3,466,193 | 9/1969 | Hughel | 429/234 X |
| 3,466,197 | 9/1969 | Hughel | 429/46 |
| 4,039,730 | 8/1977 | Brinkmann et al. | 429/228 X |
| 4,151,331 | 4/1979 | Hurg et al. | 429/228 X |
| 4,487,792 | 12/1984 | Hartmann | 429/233 X |
| 4,507,372 | 3/1985 | Rowlette | 429/228 |
| 4,687,719 | 8/1987 | Benda et al. | 429/234 |

*Primary Examiner*—Anthony Skapars
*Attorney, Agent, or Firm*—Marvin E. Jacobs

[57] ABSTRACT

A reliable positive plate for deep cycle lead-acid batteries is provided by dispersing about 2 percent by volume of fine, short, lead-coated reinforcement fibers such as fiberglass in the positive active paste before being applied to the grid of a battery plate and cured. The fibers improve the structural integrity of the plate and also provide electrical paths in a discharged plate. This results in greater utilization of the lead dioxide active material by preventing charged portions of the plate from becoming electrically isolated.

16 Claims, 1 Drawing Sheet

4,873,161

POSITIVE PASTE WITH LEAD-COATED GLASS FIBERS

ORIGIN OF INVENTION

The invention described herein was made in the performance of work under a NASA contract, and is subject to the provisions of Public Law 96-517 (35 USC 202) in which the Contractor has elected to retain title.

TECHNICAL FIELD

The present invention relates to a positive paste for a lead-acid storage battery and, more particularly, to a positive paste having improved strength and conductivity.

BACKGROUND ART

Even though there has been considerable study of alternative electrochemical systems, the lead-acid battery is still the battery-of-choice for general purpose uses such as starting a vehicle, boat or airplane engine, emergency lighting, electric vehicle motive power, energy buffer storage for solar-electric energy, and field hardware whether industrial or military. These batteries may be periodically charged from a generator.

The conventional lead-acid battery is a multicell structure. Each cell contains a plurality of vertical positive and negative plates formed of lead-based alloy grids containing layers of electrochemically active pastes. The paste on the positive plate when charged contains lead dioxide which is the positive active material and the negative plates contain a negative active material such as sponge lead. This battery has been widely used in the automotive industry for many years and there is substantial experience and tooling in place for manufacturing this battery and its components and the battery is based on readily available materials, is inexpensive to manufacture and is widely accepted by consumers.

However, during discharge, the lead dioxide (a fairly good conductor) in the positive plate is converted to lead sulfate, an insulator. The lead sulfate can form an impervious layer encapsulating the lead dioxide particles which limits the utilization to less than 50 percent of capacity, typically around 30 percent. The power output is significantly influenced by the state-of-discharge of the battery, since the lead sulfate provides a circuit resistance whenever the battery is under load. Furthermore, the lead sulfate can grow into large, hard, angular crystals, disrupting the layer of paste on the grid resulting in flaking and shedding of active material from the grid. Power consumption during charge is also increased due to the presence of the lead sulfate insulator. The lead sulfate crystals in the negative electrode can grow to a large, hard condition and, due to their insulating characteristics, are difficult to reduce to lead. Even when very thin pastes are utilized, the coating of insulating lead sulfate interferes with power output. Thus, power capability is greatly influenced by the state-of-charge of the battery.

The positive plate of the lead-acid battery is the plate that normally fails in a deep cycle application. As a battery is cycled, the positive paste softens and eventually causes the battery to fail. Failure can occur in a number of ways. As the paste softens, it can lose contact with the plate and become inactive. This reduces the capacity of the battery and eventually leads to battery failure. If the softened active material falls to the bottom of the battery and bridges the gap between a positive and negative plate, the battery will fail from short circuiting.

The softening of the active material also exposes the grid to more sulphuric acid. This accelerates grid corrosion and can produce an insulating layer on the grid which prevents the active material from being in good electrical contact with the grid. In this case, the battery would fail as a result of an interface problem between the grid and active material. Grid corrosion also produces grid growth which separates the grid from the positive active material. In this case, the battery will lose capacity and eventually fail. The major problem associated with extending the life of lead-acid batteries is maintaining the integrity of the positive plate while it is cycled.

Another problem associated with lead-acid batteries is that the electrical conductivity for a discharged or sulphated plate is very low. Discharged portions of the plate can act to electrically isolate and prevent other portions of the plate from either charging or discharging. The utilization of the plate's active material during a discharge is reduced as a result of this electrical isolation.

An apparent solution to this problem would be the addition of a conductive filler to the paste. The filler must be thermodynamically stable to the electrochemical environment of the cell, both with respect to oxidation and reduction at the potential experienced during charge and discharge of the cell, and to attack by the acid. It has been attempted to increase the conductivity of the paste by adding a conductive filler such as graphite.

Graphite has been used successfully as a conductive filler in other electrochemical cells, such as in the manganese dioxide positive active paste of the common carbon-zinc cell, and mixed with the sulfur in sodium-sulfur cells. However, even though graphite is usually a fairly inert material, it is oxidized in the aggressive electrochemical environment of the lead-acid cell to acetic acid. The acetate ions combine with the lead ion to form lead acetate, a weak salt readily soluble in the sulfuric acid electrolyte. This reaction depletes the active material from the paste and ties up the lead as a salt which does not contribute to production of storage of electricity. Highly conductive metals such as copper or silver are not capable of withstanding the high potential and strong acid environment present at the positive plate of a lead-acid battery. A few electrochemically-inert metals such as platinum are reasonably stable. But the scarcity and high cost of such metals prevents their use in high volume commercial applications such as the lead-acid battery. Platinum would be a poor choice even if it could be afforded, because of its low gassing over-potentials.

Hughel (U.S. Pat. No. 3,466,197) discloses the addition of 5-25 percent by weight of lead fibers to the positive paste of a deep-cycle lead-acid battery. Hughel also added 0.1 to 1 percent by weight of non-conductive polymeric fibers to increase the strength of the plates. The presence of non-conductive fibers increases bulk and weight and reduces efficiency of the plates. Furthermore, lead fibers are subject to significant stress corrosion during charge-recharge cycling. Pure lead fibers contain microcracks. Stress corrosion starts at the microcrack and continues until the fiber is consumed and loses its reinforcement function. It is very difficult to manufacture pure lead fibers without microcracking.

Hughel suggests strengthening a conductive latticework by use of a tissue of lead coated glass fibers. However, no lead coated wire existed with the requisite reinforcement coating and adequate strength.

Rowlette (U.S. Pat. No. 4,507,372) discloses adding $SnO_2$ coated glass fibers to a positive paste to maintain conductivity during charge and discharge. Again, there is an increase in bulk and loss of capacity since lead oxide is displaced with the tin oxide coated glass.

STATEMENT OF THE INVENTION

An improved lead-acid battery in accordance with the invention in which the positive active material maintains conductivity during both charge and discharge cycles. The power output in the battery of the invention is more uniform since it is less dependent of the state-of-charge of the battery and more nearly approaches theoretical efficiency.

The positive paste in accordance with the invention has improved structural and electrical properties by incorporating in the paste randomly dispersed, small diameter, high modulus core fibers such as fiberglass or a high melting point synthetic resin such as Aramid (a polyaromatic imide resin) coated with a corrosion-resistant cladding of lead. This material is formed by extrusion of lead onto a high modulus glass or polymeric fiber as disclosed in U.S. Pat. No. 4,658,623 and is now commercially available. Molten lead is extruded and simultaneously bonds to the fiberglass core fiber which provides increased strength and reduced strain to the lead cladding. The molten lead flows into interstices in the fiberglass core and firmly bonds the lead to the core fiber. The fiber was developed for use as a grid and frame material. The modulus of the core fiber is at least 20,000 psi and the fiber has a melting point above the melting point of lead.

The continuous, lead coated glass fibers are beneficial to the positive plate in a number of ways. During formation, which occurs after the plate is pasted and cured, the fibers reduce the plate's electrical resistance so that a larger percentage of the plate can be converted to lead dioxide. Since the lead cladding on the fiber is charged with the plate during formation, a lead dioxide corrosion layer is established on it. This corrosion layer acts to provide a good electrical and mechanical interface with the active material. The electrical interface will promote better utilization of the active material during discharge while the mechanical interface will permit the glass fibers to stiffen and strengthen the plate. A stronger plate will last longer and provide more reliable service in a deep cycle application.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
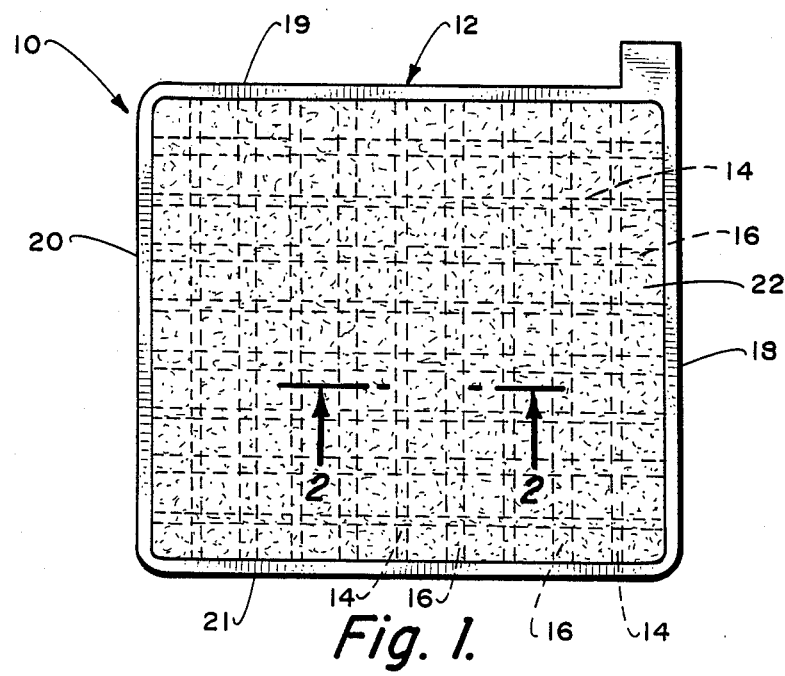
FIG. 1 is top view in elevation of a positive plate containing a paste of the lead coated fiberglass fibers according to the invention.
Figure 2:
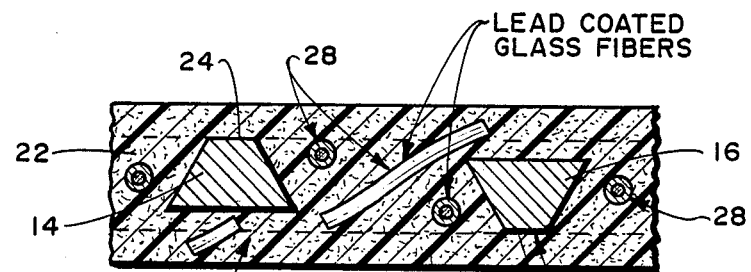
FIG. 2 is a view in section taken along line 2—2 of FIG. 1.
Figure 3:
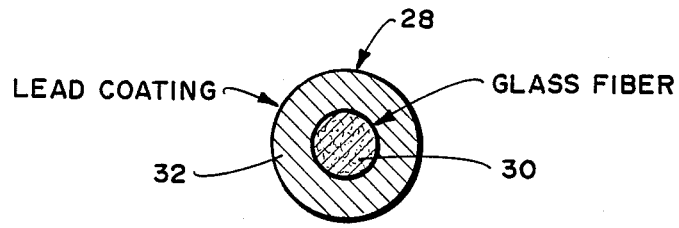
FIG. 3 is a cross section of a lead coated glass fiber.

Referring now to FIGS. 1 and 2, a positive plate 10 is formed of a frame 12 having grid wires 14, 16 attached to the sides 18, 20 and the top 19 and bottom 21 of the frame 12. The grid wires 14, 16 preferably have slanted converging sides forming a trapezoidal shape which provides better mechanical locking of the paste 22 in place. The grid wires 14 with the shorter top face 24 facing upwardly alternate with grid wires 16 having the shorter face 24 facing downwardly. The paste 22 contains a random distribution of lead coated glass fibers 28 throughout the layer of paste 22. Referring now to FIG. 3, the fibers 28 are formed of a fiberglass core fiber 30 coated with a layer 32 of lead. The grid frames are composed of lead or lead alloys with a metal such as antimony. The frame can take other forms such as an expanded metal grid; a fluid impervious sheet for forming a monopolar or bipolar plate, a conductive resin frame or thin profile frames for use in high performance batteries.

The improved positive paste contains from about 0.1 to 10 percent by volume of short, fine lead-coated glass fibers. The glass fiber can be monofilament or a multifilament fiber. Preferred fibers are monofilament glass fibers having a diameter from about 0.1 to 100 mils, generally from 1 to 10 mils. The lead-coating has a thickness usually at least 1–50 percent the diameter of the core fiber. Thus, the diameter of the composite fiber ($D_F$) will be at least 1.5 $D_G$ (diameter of glass) fiber, generally from 2 $D_G$ to 5 $D_G$. The continuous lead-coated glass fibers have a length ($L_F$) at least as long as their diameter ($D_F$). Usually the fibers will have a $L_F/D_F$ of from 5 to 20, usually about 8 to 12.

As an example of practice, a lead frame for a conventional lead-acid storage battery had a thickness of about 100 mils with spacing between the trapezoidal grid wires of 200 mils. A wet paste was prepared from lead sulfate containing 2 percent by volume of lead-coated glass fibers that had a diameter of 10 mils and an average length of 100 mils. The lead thickness was 3 mils on a 4 mil diameter multifilament glass fiber. The paste was trowelled onto the grid and dried.

This amount of lead-coated glass fiber in the plate would result in a 5 percent weight penalty, i.e., increase the plate weight by 5 percent. The use of these fibers must, therefore, increase the utilization of the plate by 5 percent if a weight penalty is not to be incurred. Any penalty will be reduced somewhat by the fact that as the lead coating corrodes, it is converted into active material.

Approximately twenty-five fibers will be in a pellet, i.e., the active material between the grid wires, in the above example. This assumes a length for the pellet size of 0.500" and a pellet volume of 0.01 in.$^3$. Since the volume of one fiber is $78.5 \times 10^{-7}$ in.$^3$. One result of adding fibers to the paste can be a reduction in grid weight achieved by increasing the spacing between the grid wires. This increase in pellet size would have a corresponding increase in the number of fibers in the pellet.

Although the above example illustrates how the lead-coated glass fibers are arranged in the positive plate, many other designs are possible. Fibers of smaller dimensions would be preferred with a thinner plate. Thin plates and plates with low paste density exhibit high performance but low life. Lead-coated glass fibers could also be helpful in extending the life of these high-performance plates.

A positive plate similar to the one illustrated in the example was tested in a deep cycle application. The plate exhibited much longer cycles without deterioration in capacity or failure as compared to a conventional lead-oxide pasted positive plate. When the lead-coated fibers are examined after use in a deep cycle battery, they do not evidence corrosion or microcracking. Since the lead coated glass fibers provide reinforcement, the plate frame need not be constructed with antimony alloys which increase corrosion and can cause gas elimination evolution.

It is to be realized that only preferred embodiments of the invention have been described and that numerous substitutions, modifications and alterations are permissible without departing from the spirit and scope of the invention as defined in the following claims.

We claim:

1. A positive paste for a lead-acid battery comprising:
   a layer of positive active material comprising lead dioxide containing a dispersion of 0.1 to 10% by volume of lightweight, reinforcement fibers containing a lead coating formed of a high modulus core fiber.

2. A paste according to claim 1 in which a surface layer of lead dioxide is present on the surface of the lead coating.

3. A paste according to claim 1 in which the core fiber has a modulus of at least 20,000.

4. A paste according to claim 3 in which the lead cladding is formed by extruding molten lead onto the fiber.

5. A paste according to claim 4 in which the core fibers are selected from glass fibers or a synthetic resin fiber with a high melting point and a high modulus.

6. A paste according to claim 5 in which the synthetic resin is an aromatic imide resin.

7. A paste according to claim 5 in which the glass fiber is selected from monofilament and multifilament fibers.

8. A paste according to claim 7 in which the core fiber is a monofilament.

9. A paste according to claim 3 in which the core fiber has a diameter from 0.1 to 100 mils and the lead coating has a thickness from 0.005 to 50 mils.

10. A paste according to claim 9 in which the reinforcement fiber has a length to diameter ratio of from 2 to 5.

11. A positive battery plate comprising:
    an open frame having an outer perimeter including top, bottom and two side frame members, defining an open paste receiving compartment;
    a plurality grid wires extending between said side members; and
    a layer of paste according to claim 1 received in said frame compartment covering and attached to said grid wires.

12. A plate according to claim 11 in which a plurality of further grid wires extend across the open compartment and are connected to the top and bottom frame members.

13. A plate according to claim 12 in which the grid wires are trapezoidal in shape having a long base and short top.

14. A plate according to claim 13 in which the wires alternate with a wire with a long base facing upwardly alternating with a wire with a short top facing upwardly.

15. A plate according to claim 14 in which the wires and frame members are formed of lead.

16. A positive paste according to claim 1 in which the ratio of the diameters of the reinforcement fiber to the core fiber is at least 1.5:1.

* * * * *